United States Patent [19]

Atkinson

[11] 4,095,490
[45] Jun. 20, 1978

[54] METHOD OF MAKING CHISEL-TYPE CUTTER LINK

[75] Inventor: Renwick S. Atkinson, Portland, Oreg.

[73] Assignee: Carlton Company, Milwaukie, Oreg.

[21] Appl. No.: 716,016

[22] Filed: Aug. 19, 1976

[51] Int. Cl.² .............................................. B23D 63/00
[52] U.S. Cl. ........................................ 76/112; 72/379
[58] Field of Search ............... 76/112, 101 R; 72/356, 72/379

[56] References Cited

U.S. PATENT DOCUMENTS

| | | | |
|---|---|---|---|
| 3,154,972 | 11/1964 | Neumeier et al. | 76/112 |
| 3,696,692 | 10/1972 | Baranowski et al. | 76/112 |
| 3,837,241 | 9/1974 | Weiss | 76/112 |

Primary Examiner—Harold D. Whitehead
Assistant Examiner—Roscoe V. Parker, Jr.
Attorney, Agent, or Firm—Kolisch, Hartwell, Dickinson & Stuart

[57] ABSTRACT

A method of cold-forming a substantially right-angle final bend in a chisel-type saw-chain cutter link. The method involves the progressive, staged shifting of a bend, and of the inside and outside corners therein, in a cutter blank from a starting, greater-than-right-angle bend line toward an adjacent, substantially parallel, final substantially right-angle bend line. Subsequent to the making of an initial bend in a blank, the making of later shifted bends is accompanied by the flowing of material in the blank toward the region of the later-produced bends.

5 Claims, 8 Drawing Figures

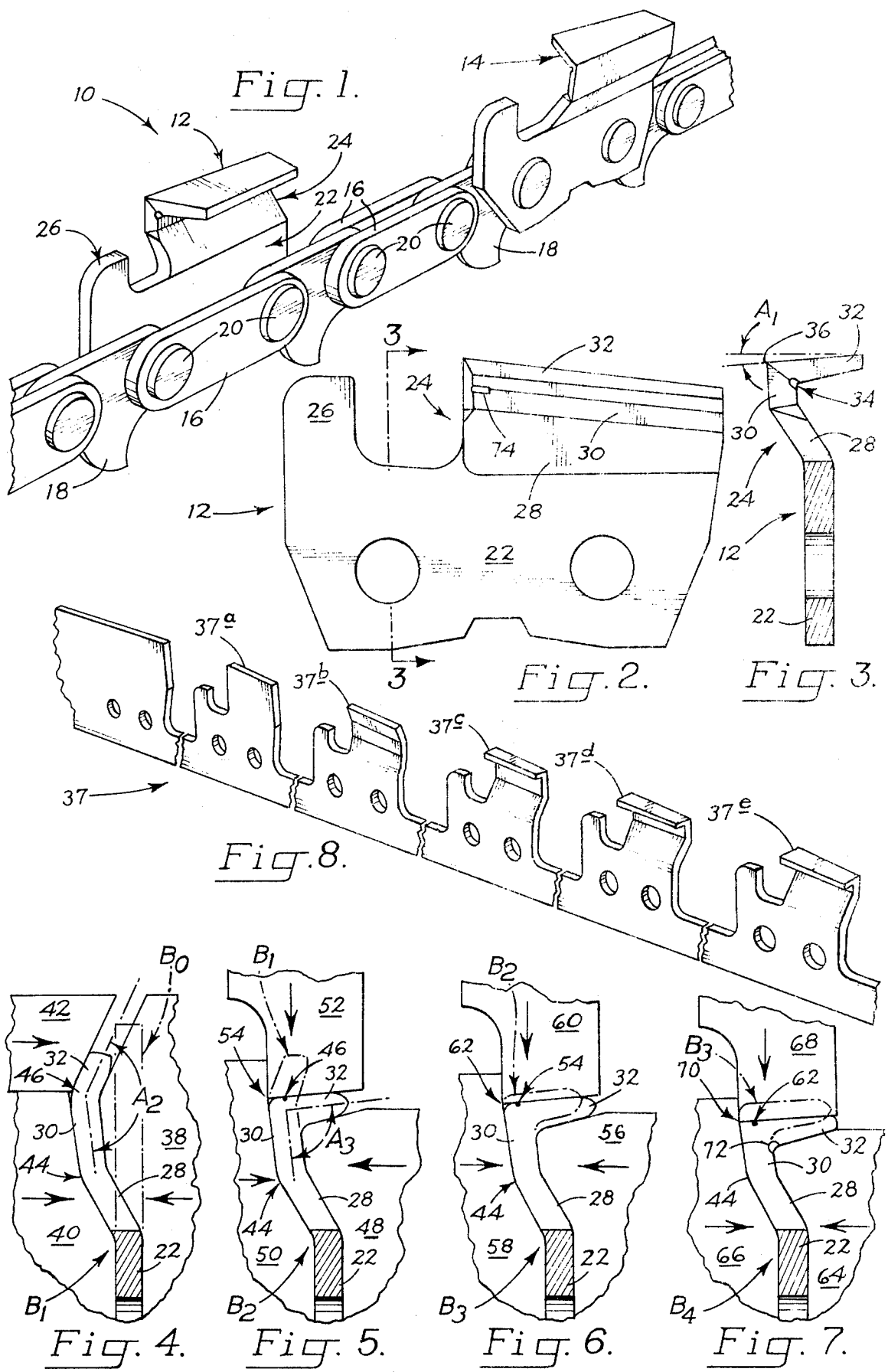

METHOD OF MAKING CHISEL-TYPE CUTTER LINK

BACKGROUND AND SUMMARY OF THE INVENTION

This invention pertains to a method for forming a chisel-type saw-chain cutter link, and more particularly, to a method for forming a substantially right-angle bend in such a link.

A chisel-type saw-chain cutter link is one which includes a substantially right-angle bend in the blank with the outside of the bend being defined by a sharp corner. Methods proprosed in the past for manufacturing such a link have not been entirely satisfactory. For example, casting a link with such a bend, followed by grinding of the bend's outside corner, is quite an expensive operation. Methods have been proposed essentially for bending a flat blank to produce the desired bend, but these have not been particularly successful. For example, where an attempt is made to produce, in a single bending operation, a bend of the finally desired angle, breakage is often a problem.

A general object of the present invention is to provide a unique cold-forming method for forming a link of the type described, in which relatively simple bending steps are used to produce the final desired bend, with the requisite degree of outside corner sharpness.

According to a preferred manner of practicing the invention, the proposed method includes the producing of an initial larger-than-desired-final-angle bend along a first bend line in the blank, then shifting the bend, so-to-speak, so as to shift the bend line in the blank toward a location spaced laterally from that of the first made bend, and more particularly toward the line along which the finally desired bend is to be located, and while so shifting the bend, decreasing its angle toward the desired final angle, and flowing material in the blank generally in the direction of bend-line shifting. In the specific way of practicing the method which is illustrated and described herein, four bending steps are utilized, each producing a bend in a blank along a different laterally spaced line in the blank, progressing from an initial bend line toward a final bend line. Following the making of the initial bend, the making of each subsequent bend results in flattening of the prior-made bend accompanied by flowing of material from the region of the prior-made bend toward the region of the next bend.

The proposed method, therefore, results in the flowing of material generally toward the region where the final bend is located, with such flowing both obviating the breakage problem which has been encountered in prior art methods, and forcing material to form a sharp outside corner defining the outside of the final bend.

Another feature of the invention is that the type of bending contemplated is usable to considerable advantage in connection with bending along the line of "grain" in a metal blank. This allows the simple production of cutter links from a continuous metal strip. It has been thought, heretofore, that successful bending operations to produce a link of the type outlined could be produced only in a "cross-grain" direction. Consistent breakage characterized prior art attempts to bend in the direction of the grain. The steps contemplated by the present invention readily allow bending in the direction of the grain, and have been found to produce cutter links with strength characteristics superior to those achieved with prior art cross-grain bent links.

These and other objects and advantages which are attained by the invention will become more fully apparent as the description which now follows is read in conjunction with the accompanying drawings.

DESCRIPTION OF THE DRAWINGS

FIG. 1 is a fragmentary top perspective view illustrating a portion of a saw-chain including chisel-type saw-chain cutter links made in accordance with the present invention.

FIG. 2 is a side elevation, on a slightly larger scale than FIG. 1, illustrating a single link made in accordance with the invention and removed from a chain.

FIG. 3 is a cross-sectional view taken generally along the line 3—3 in FIG. 2.

FIGS. 4-7, inclusive, illustrate steps performed according to the invention during formation of a link like those shown in FIGS. 1-3, inclusive.

FIG. 8 is a fragmentary top perspective view showing a continuous metal strip with portions formed according to the steps illustrated in FIGS. 4-7, inclusive.

DETAILED DESCRIPTION OF THE INVENTION

Turning now to the drawings, and with reference first to FIGS. 1-3, inclusive, indicated generally at 10 in FIG. 1 is a portion of an elongated endless saw-chain. Chain 10 includes alternating left and right-hand chisel-type cutter links 12, 14, respectively, interconnected in the usual fashion through tie straps, such as those shown at 16, drive links, such as those shown at 18, and pins such as those shown at 20. A left-hand cutter link, like link 12, is shown in FIGS. 2 and 3 removed from a chain.

Each cutter link, like link 12, is a unitary piece formed, as will shortly be explained, from a flat metal blank, which may either be a single piece about the size of a final link, or a portion of a continuous strip of material. Link 12 includes a mounting base portion 22, a cutter portion 24 and a depth gauge portion 26. The present invention concerns in particular that aspect of forming a cutter link which involves the shaping of the cutter portion.

As can be seen particularly well in FIG. 3, cutter portion 24 includes an upwardly inclined web portion 28 which joins integrally with base portion 22, and which in FIG. 3 slopes upwardly and to the left. The cutter portion also includes a substantially upright web portion 30 and a generally horizontal web portion 32. Actually, with base portion 22 occupying an upright plane (as in FIG. 3), the top surface of web portion 32 slopes upwardly (and to the right in FIG. 3) at an angle of about 3° from the horizontal. This angle is designated $A_1$ in FIG. 3.

It will be noticed that web portions 30, 32 are at substantially a right angle to each other along an inside corner bend line in the link indicated generally at 34. It will further be noticed that the outside of this angle is defined by an outside sharp corner 36. As will be explained, whereas according to prior art techniques a corner like corner 36 is arrived at through a fairly costly and time-consuming grinding operation, in link 12 it is achieved without grinding, in accordance with the formation steps contemplated by the present invention. The term "sharp" as used herein refers to a radius on this corner of within the range of about 0.001 to about 0.005 inches.

The lead edges of web portions 30, 32 (those facing the viewer in FIG. 3) are underbeveled, as illustrated, through a conventional grinding operation, so as to sharpen these edges for cutting purposes. The present invention has nothing to do with this sharpening operation.

It will be appreciated by those skilled in the art that the shape just described for link 12 is quite conventional. What will now be described is the method of the present invention which results in the described shape.

FIGS. 4–8, inclusive, illustrate the preferred bending steps contemplated by the invention. One important feature of the invention is that it permits formation of a bend, like bend 34, in a metal blank in any direction relative to the grain in the blank. As a consequence, it is possible according to the invention easily to perform what might be thought of as a continuous, serial operation, where links are produced from an elongated strip of metal fed into a die, in which strip the grain substantially parallels the strip's longitudinal axis. A fragment of such a strip is shown at 37 in FIG. 8, with portions thereof, shown at 37a, 37b, 37c, 37d, 37e, illustrating the results of various successive steps in the formation of a link. The grain in strip 37 is not visible to the naked eye. However, the longitudinally extending surface marking lines which appear in FIG. 8 along the bottom of strip 37 may be taken as a graphic representation of grain direction in this strip. To the left of portion 37a in the figure the strip has been punched with pairs of mounting holes (as shown) for a link. Portion 37a has been further punched to form the general outline of a blank for a link. Portions 37b–37e, inclusive, show the results of several bending operations as contemplated herein. What occurs after the stage resulting in portion 37e will be explained shortly.

FIGS. 4–7, inclusive, show schematically what occurs in a die to form portions in a strip like portions 37b–37e, inclusive. In each of these four figures, there are shown, in greatly simplified form, three die components which work in cooperation to produce bending.

With specific reference then to FIG. 4, the bending components shown herein include an anvil 38, a hammer 40, and a bending punch 42. With a blank portion, such as previously mentioned portion 37a, held in the appropriate position relative to these components, the hammer and anvil are moved relatively toward each other, either by movement of both components, or by movement of one with respect to the other, as indicated by the opposed arrows in FIG. 4. This action results in bending of the blank to form a bend at 44 which defines the region of joinder between previously mentioned web portions 28, 30. Bend 44 is the final bend produced in this particular area of the blank. Next, bending punch 42 is actuated in the direction of the arrow indicated on the punch to bend the upper portion of the blank against anvil 38 to produce a bend at 46. Bend 46 is the first of several still-to-be-described bends which result in the final production of the substantially right-angle intersection between web portions 30, 32. As can be seen, the initial angle $A_2$ which is produced by the operation of punch 42 is considerably greater than 90°. Also, and as will become apparent, the location of the line along which bend 46 extends in the blank, as well as the locations of the inside and outside corners contained in the bend, are located upwardly in the blank (as such is depicted in FIG. 4) from the line along which the final bend will be produced.

As an aid to understanding the operation just described relative to FIG. 4, the cross-sectional outline of the blank prior to bending is shown in dashed outline at $B_0$ in the figure. This corresponds to 37a in FIG. 8. The final outline is shown at $B_1$ in solid lines. Such shape corresponds to 37b in FIG. 8. This same visual aid is used in FIGS. 5, 6 and 7.

In FIG. 5 the blank portion bent to the configuration shown at $B_1$ in FIG. 4 is subjected to the operation of an anvil 48, a hammer 50 and a punch 52. The anvil and hammer are moved relatively toward one another against the blank, and then punch 52 is brought downwardly in the figure against the blank to produce the shape for the blank indicated at $B_2$ in FIG. 5. It will be noticed that the face portion of anvil 48 which defines the right side of web portion 30 in the blank has a considerably smaller vertical dimension in FIG. 5 than the corresponding face portion of anvil 38. It will also be noticed that the opposing faces of anvil 48 and punch 52 are disposed at substantially a right angle to the opposing faces of anvil 48 and hammer 50. As a consequence, web portions 30, 32 in blank $B_2$ are bent substantially to the final angle which they will have with respect to each other in the completed cutter link. The shape shown at $B_2$ corresponds to that shown at 37c in FIG. 8.

Further, and importantly, it will be noted that the operation now being described produces a bend 54 in the blank which, with its inside and outside corners, is at a location closer to bend 44 than previously mentioned bend 46, the location of which is indicated by a dot in FIG. 5. It will thus be apparent that what occurs with the operation depicted in FIG. 5 is that previously mentioned and described bend 46 is flattened, and a new bend along a new bend line in the blank is produced at 54, which new bend line is shifted toward bend 44. Further, the operation just described, and particularly the action of punch 52 relative to anvil 48 and hammer 50, results in the flowing of material in the blank to the left in FIG. 5 along and through web portion 32. This action results in part from the slight leftward divergence apparent in the opposing faces of anvil 48 and punch 52. An important consequence of this action of flowing of material is that material is forced toward the location of newly produced bend 54, both for the purpose of beginning to sharpen the outside corner at the location of this bend between web portions 30, 32, and also to minimize and negate the stretching which would otherwise occur in the material in the blank along the outside of the bend. Such stretching produces breakage.

Referring to FIG. 6, here are shown an anvil 56, a hammer 58 and a punch 60. These three components are operated in a manner identical to those described with respect to FIG. 5, to reshape blank $B_2$ to the shape indicated at $B_3$ in FIG. 6. In FIG. 6 it will be noted that the face portion of anvil 56 which defines the right side of web portion 30 has a somewhat smaller vertical dimension in the figure than that of the corresponding face portion in anvil 48. Thus, operation of the components shown in FIG. 6 results in vertical shortening of web portion 30. More importantly, this operation results in flattening of previously described bend 54, which is indicated by a dot in the figure, and the production of a new bend 62 along a new bend line in the blank which, along with its inside and outside corners, is closer to bend 44 than bend 54. The bending operation depicted in FIG. 6 also results in the additional flowing of material to the left in web portion 32 in the figure toward the location of new bend 62. This operation causes further sharpening of the corner defining the outside of the bend between web portions 30, 32, and such is illustrated in FIG. 6. Shape $B_3$ corresponds to 37d in FIG. 8.

FIG. 7 depicts a final bending operation, and shown in this figure are an anvil 64, a hammer 66 and a punch 68. These components are operated on blank $B_3$, in a cooperative action like that described with respect to FIGS. 5 and 6, to produce the final shape shown at $B_4$ in FIG. 7. It will be noted in FIG. 7 that the face portion of anvil 64 which defines the final right face of web portion 30 is shorter (vertically in the figure) than that of the corresponding face portion in anvil 56. Consequently, previously mentioned bend 62 is flattened during operation of punch 68, and a new and final corner bend, with new inside and outside corners, is produced at 70 along a line shifted toward bend 44 from prior bend 62. In addition, and as was true in the cases of the operations shown in FIGS. 5 and 6, material in web portion 32 flows toward bend 70, and this final bend produces the sharp outside corner (designated 36 in FIG. 3) which the invention produces in a cutter link.

A further feature of the invention is shown in FIG. 7. At 72 is a projection which is formed on the near end (toward the viewer) of the upper left corner of anvil 64 in the figure. Projection 72 further assists in forcing material to flow toward the lead side or edge or corner 70 for the purpose of assuring that the lead face of the cutter portion in a link has material worked all across the face into the front side of corner 70. In FIGS. 2 and 3, the depression produced in the material by projection 72 is illustrated at 74. What is shown as shape $B_4$ in FIG. 7, and as 37e in FIG. 8, represents a substantially completed cutter link formed in acordance with the steps of the present invention. Where, as in the case now being described, such links still form part of a unitary elongated strip of material, a punching operation may be used to separate the link from the strip, and to define the peripheral outline of the bottom edge of the link. Further, the link is subjected to a conventional cutter-face sharpening operation to prepare the link for use.

Occasionally, the steps described with respect to FIGS. 5, 6 and 7 will result in a slight outwardly projecting ridge of material known as "flash" extending along corner 70. This may be removed either by a very simple light grinding or touch-up operation, or by tumbling of a batch of links.

It should, of course, be borne in mind that while the steps of the invention have been described in connection with preparing the links out of a continuous elongated strip of material, the same steps of the invention are usable just as easily with regard to prepunched individual separate blanks.

It is thus possible according to the invention to produce a chisel-type cutter link, with the sharp outside corner described, utilizing relatively simple progressive bending steps, as illustrated, accompanied by the flowing of material toward later-produced bends to minimize stretching in the outside corners of the bends. The final sharpness which is attained at this corner falls within the range mentioned earlier in this description. The flowing of material is an important aspect of the invention, in that it obviates the breakage problem encountered in prior art techniques, and avoids the necessity for a costly corner-grinding sharpening operation.

While four bending steps have been described specifically herein, it will be understood by those skilled in the art that different numbers of steps may be used if desired to suit different applications. Thus, while a preferred method of practicing the invention has been outlined, it is appreciated that variations and modifications may be made without departing from the spirit of the invention.

It is claimed and desired to secure by Letter Patent:

1. A method of forming from a blank a chisel-type saw-chain cutter link comprising producing a first bend in the blank, with such having inside and outside corners and being located at a first position in the blank which is to one side of another position in the blank wherein a final bend is desired, producing a subsequent bend in the blank, with such having inside and outside corners that are shifted from the corners of the first-mentioned bend, and with the second-mentioned bend being located toward said other position from said first position, and during producing of said second-mentioned bend, flowing material in the blank from the region of the first-mentioned bend toward the region of the second-mentioned bend.

2. A method of forming from a blank a chisel-type saw-chain cutter link comprising producing a first bend in the blank along a line laterally offset from the line along which a final bend is desired, said first bend having inside and outside corners, thereafter producing at least a second bend in the blank along the latter-mentioned line to create the desired final bend, with such having inside and outside corners shifted from the positions of such corners in the first-produced bend, and during the production of the second-mentioned bend, causing material in the blank to flow from the region of the first-mentioned bend toward the region of the final bend.

3. A method of cold-forming a chisel-type saw-chain cutter link from a blank to form a final substantially right-angle bend therein, with a sharp outside corner, said method comprising in a preliminary bending operation producing a substantially greater-than-right-angle bend in said blank along a line disposed to one side of where said final bend is desired, said bend having inside and outside corners, in a subsequent bending operation producing another bend in said blank along the line where said final bend is desired, said other bend having inside and outside corners shifted from the positions of such corners in the first-produced bend, and during said subsequent bending operation, flowing material in the blank from the region of said first-mentioned bend toward the region of said second-mentioned bend.

4. A method of cold-forming a chisel-type saw-chain cutter link from a substantially flat metal blank to create a substantially right-angle bend in the blank at a desired location, with such bend having a sharp outside corner, said method comprising producing a plurality of successive laterally spaced bends in said blank with each extending substantially parallel to the grain in the blank and with the successive bends progressing from a first position in the blank, which is offset from said desired location, toward said desired location, during said producing of said plurality of bends, and with each successive bend, flattening the previously made bend, and during said flattening causing metal in the blank to flow from such previously made bend toward the next successive bend.

5. A method of forming a substantially right-angle bend in a chisel-type saw-chain cutter link blank comprising producing an initial larger-than-right-angle bend along a first bend line in the blank, shifting the bend so as to shift the bend line in the blank toward a location spaced laterally from that of the first-made bend, and while so shifting, decreasing the angle of bend, and flowing material in the blank generally in the direction of said shifting.

* * * * *